United States Patent Office 3,723,302
Patented Mar. 27, 1973

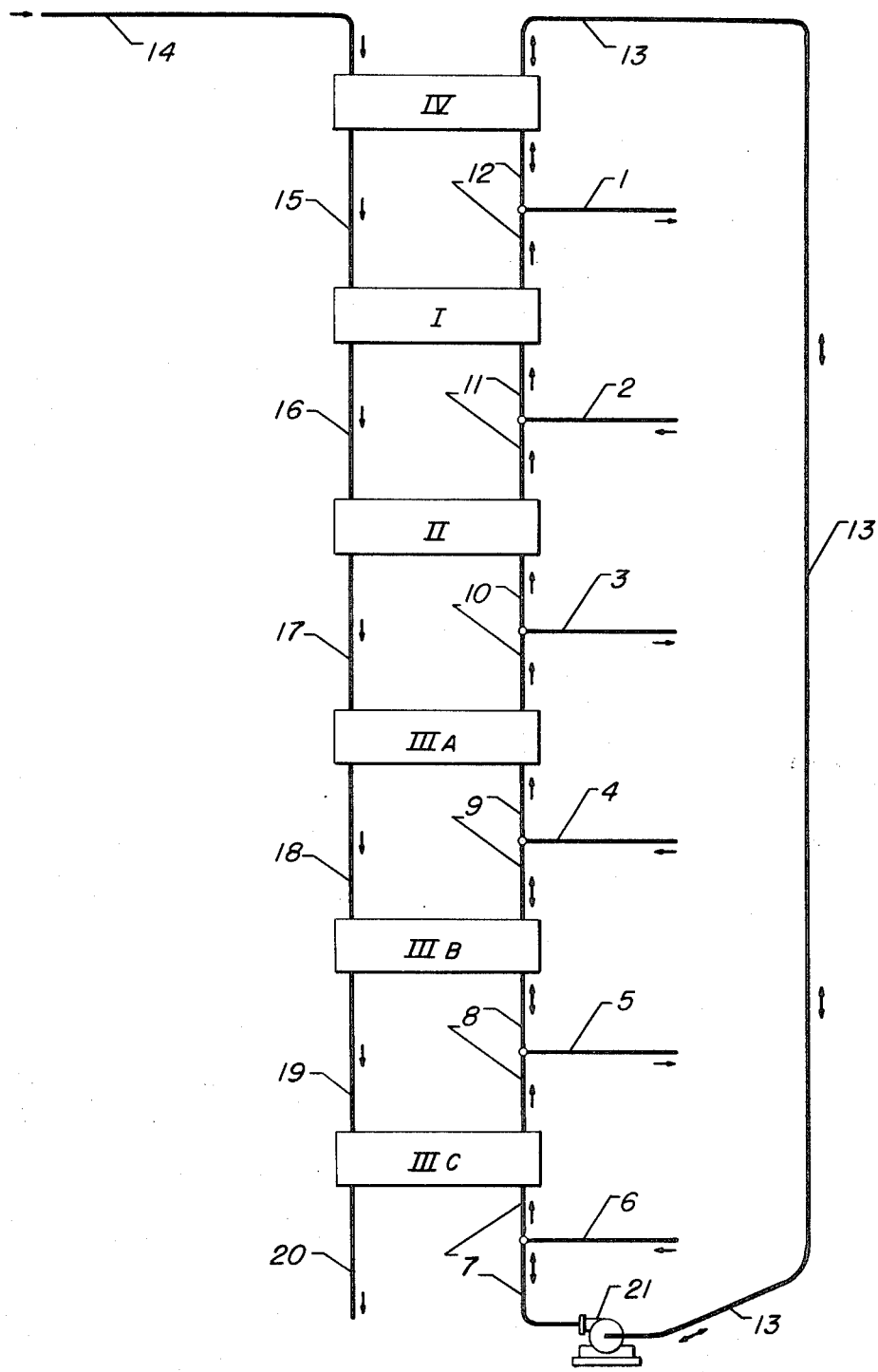

3,723,302
PROCESS FOR SEPARATING OLEFINS FROM SATURATED HYDROCARBONS
Joe M. Pharis and Frank H. Adams, La Grange Park, Ill., assignors to Universal Oil Products Company, Des Plaines, Ill.
Filed Apr. 30, 1971, Ser. No. 139,032
Int. Cl. C10g 25/00
U.S. Cl. 208—310                10 Claims

ABSTRACT OF THE DISCLOSURE

An improved process for separating olefinic hydrocarbons in high purity from a feed stream containing a mixture of olefinic and paraffinic hydrocarbons along with contaminants including aromatic hydrocarbons. The general process operations include a contacting operation wherein an olefinic hydrocarbon is preferentially adsorbed by an adsorbent in an adsorption zone. Subsequent contacting with a desorbent material in a desorption zone effects the removal of preferentially adsorbed olefins from the adsorbent. The improvement resides in effecting the removal of product olefins from the adsorbent by using a second desorbent prior to contacting the adsorbent with a first desorbent to effect a desorption of the more tenaciously held contaminant hydrocarbons. The improvement allows a higher concentration of second desorbent to desorb olefins while preventing contamination of the extract olefins with contaminant materials.

BACKGROUND OF THE INVENTION

Field of the invention

The field of art to which this invention pertains is hydrocarbon separation. More specifically, this invention pertains to a countercurrent flow fixed bed type separation process in which an olefinic hydrocarbon is selectively adsorbed from a feed stock containing predominantly saturates and olefins. The olefinic hydrocarbons are recovered by contacting the adsorbent with a second desorbent in the desorption zone. Additionally, in the desorption zone, aromatic and non-normal hydrocarbons which are present in the feed stock as contaminants are also removed from the adsorbent by a first desorbent and withdrawn through a separate extract removal stream.

Description of the prior art

Applicants recognize the abundance of prior art in the separation field especially that art relating to countercurrent fixed bed type operations which are commonly referred to as simulated countercurrent flow fixed bed type operations and particularly exemplified in U.S. Pat. 2,985,589.

Typical of the prior art process are those involving the countercurrent contacting of a solid adsorbent and a fluid stream while maintaining a fixed bed of adsorbent. Operations are effected by a shifting of inlet and outlet streams throughout an adsorbent bed system to effect a countercurrent flow of fluid and the adsorbent. Improvements which have been recognized for these type processes include process flows including internal flush streams to flush the interstitial void spaces located between the adsorbent particles of any material which is not desired to be present in the stream which is to be recovered from the adsorbent in a subsequent desorption step. The prior art processes do not utilize dual desorbent streams to remove product extract material and undesired adsorbed contaminants from the adsorbent. In instances where contaminant material is more tenaciously held upon the adsorbent than any of the other feed materials the capacity of the adsorbent is diminished to the extent that it adsorbs the contaminant. The prior art processes have not dealt with contaminants other than by regeneration or shutting down the process while applicants have recognized a method of altering the flow characteristics of a countercurrent flow fixed bed type adsorptive-separation unit to allow a controlled removal of a contaminant which is more tenaciously held by an adsorbent than the other feed components. Applicants have recognized that feed stocks which are used in the process of this invention generally contain dienes or aromatic hydrocarbons which fall within the boiling range of the feed stock used. These contaminants pass into the adsorptive-separation zone to take up capacity of the adsorbent because of their ability to be retained upon the adsorbent more tenaciously than the selectively adsorbed olefinic hydrocarbons.

Applicants have eliminated some of the problems associated with olefinic separation processes by utilizing dual extract withdrawal streams to first remove product olefins from an adsorbent and second, to remove contaminants from the adsorbent. This flow scheme is disclosed and claimed in applicants pending application S.N. 100,105 entitled "An Improved Process for Separating Olefins From Saturated Hydrocarbons" filed on Dec 21, 1970 and now abandoned. In the pending application a single desorbent is used to desorb both the contaminants and the olefins from the adsorbent. In the normal countercurrent flow of fluid and solid adsorbent, the adsorbent enters a desorption zone containing both product olefins and contaminant material as adsorbed materials. Desorbent material contacts the adsorbent and causes product olefins to be initially desorbed; later on the contaminant material is desorbed. Since the desorbent flows countercurrent to the adsorbent flow, the adsorbent initially contacting desorbent material contains both contaminants and product olefins. The desorbent at this point contains mixed with it some contaminant material, since the desorbent has already contacted adsorbent material at the other end of the desorption zone.

The desorbent initially passing into the desorption zone is essentially pure, but as it proceeds through the desorption zone it first desorbs contaminant material from the adsorbent since the product olefins are easier to desorb and have been described by contact with desorbent at the downstream location of the desorption zone. The recovery of olefins is accomplished using desorbent which may contain appreciable quantities of contaminants. In applicant's pending application the olefins are recovered from an extract olefin outlet stream which is downstream from the extract contaminants outlet stream. The process of the present invention utilizes two different desorbents— one for contaminant desorption and the other for olefin desorption. The advantages of using our invention include are ability to use desorbents having different abilities to desorb olefins or contaminants and the opportunity to utilize a desorbent for olefin desorption which is relatively pure since the olefin desorbent need not pass through all of the adsorbent present in the desorption before it functions to desorb olefins.

SUMMARY OF THE INVENTION

It is an object of the present invention to present an improved separation process wherein adsorbed contaminant and product materials present in feed streams which contact an adsorbent are removed from the adsorbent through the use of a dual desorbent flow system.

Some of the contaminants which we are concerned with, include aromatics such as benzene or alkylbenzes, alkyl-indanes, or the indanes, bicyclic aromatic including naphthalenes, biphenyls, or the acenaphthenes. The above mentioned aromatic contaminants can be generally characterized as having the general formula of $C_nH_{2n-J}$, where J as used in the mass spectrometer art, indicates a specific number which when supplied in the above mentioned empirical formula can allow distinctive separation of complicated aromatic types. We have found that certain $J_6$ and $J_{12}$ aromatic hydrocarbons are those which are most strongly held on the adsorbent. Other types of aromatic hydrocarbons such as the $J_8$ or $J_{10}$ or even $J_{16}$ type hydrocarbons would also be strongly adsorbed. Additional contaminants include cyclo-olefins and di-olefins both of which are more tenaciously held by the adsorbent than the normal mono-olefins in the feed.

Preferred feed stocks which can be used in the process of this invention include those streams having mono-olefinic concentrations of from about 1% to about 25% although higher concentrations of olefins may be present in a feed stock which has previously been passed through an olefinic concentration process. The feed stocks used in the process of this invention are for the most part straight-chain hydrocarbon type materials having a carbon number range of from about 6 carbon atoms per molecule to about 30 carbon per molecule. The olefins are generally present with normal paraffins having about the same carbon number spread and in addition the feed stock will normally contain minor portions of aromatic and multiple olefinic type hydrocarbons. The contaminants have been found, in adsorptive-separation operations in which a crystalline aluminosilicate adsorbent is used, to be harmful to the process in that they can substantially reduce the capacity of the adsorbent for the mono-olefinic hydrocarbons which are desired to be absorbed. The contaminants also can be reduce to the purity of the product extract stream.

Various methods of pre-treatment of the above feed stock have been used in attempting to remove all or a portion of the contaminants. These methods have included acid washing or contacting the feed stock in a pre-treatment zone containing an adsorbent which will remove the contaminants. The present improved process allows these contaminants too be passed into the process in relatively small concentrations without undue loss in adsorbent capacity.

The desorbents which can be used in this process include olefinic type hydrocarbons which boil at temperatures sufficiently different than the boiling temperature of the feed stock. Both branched or straight chain mono-olefins can be used as desorbents. Additionally aromatic type hydrocarbons may be used as desorbents. In some instances it will be advantageous to employ desorbents which contain a mixture of normal olefins or isoolefins and, normal or iso-paraffins or paraffins or aromatics. Typical desorbents which can be used for a feed stock containing $C_{10}$ through $C_{14}$ monoolefins and paraffins is a desorbent mixture comprising about 80 vol. percent octene-1 and 20 vol. percent iso-octane. In most instances it is preferred to use a lower molecular weight desorbent mixture as compared to the feed stock. An example of a desorbent which can be used when $C_6$ through $C_9$ feed stock is employed is a desorbent containing about 80% of a straight chained butylene and about 20 vol. percent of normal butane.

Since there are two different desorbent streams required for use in the present invention, it is contemplated that different desorbents may be used for desorption of olefins and contaminants. In some instances a single desorbent composition can be used to desorb both olefins and contaminants from the adsorbent. In this case the advantage of using the additional desorbent stream is that a relatively pure desorbent stream is available for desorption of olefins.

The first desorption stream is referred to as that desorbent stream which is used to desorb the contaminants from the adsorbent. This desorbent stream should contain a desorbent which more easily desorbs contaminants than olefins since its function is to eliminate contaminants from the adsorbent. However, this desorbent does not necessarily have to desorb contaminants more easily than the olefins for the process to be operable. Typical desorbents which can be used for the first desorbent are aromatics or straight or branched chain olefins with or without paraffinic diluents. In order to prevent the adsorbent from losing capacity because the first desorbent which has displaced contaminants is adsorbed on the adsorbent, the first desorbent must be able to be displaced by raffinate components when they contact the adsorbent.

The second desorption stream is referred to as that desorbent stream which is used to desorb olefins from the adsorbent. This stream should contain hydrocarbons which can easily desorb olefins from the adsorbent. Typically, the second desorbent can contain both straight or branched chained olefins in mixture with paraffins. Since the first desorbent should remove the contaminants from the adsorbent the second desorbent may be only required to desorb olefins.

A preferred dual desorbent system can include first and second desorbent streams which contain the same olefins and paraffins and which have a lower boiling point than the feedstock. The first desorbent stream should contain a higher concentration of olefins than the second desorbent stream since the first desorbent must desorb the strongly held contaminant materials from the adsorbent. Specific desorbent compositions include a first desorbent made up of 100% octene-1 and a second desorbent made up of from about 100% to 70% octene-1 diluted with iso-octane.

Operating conditions for both adsorption and desorption of the monoolefins should include both vapor and liquid phase operations. The liquid operations are generally preferred because of the resulting lower temperature requirements which reduce the opportunity for side reactions to occur. The side reactions generally consist of polymerization of the olefins present in the feed stock while they are in contact with the adsorbent.

Operating conditions can include temperatures within the range of from about 25° C. to about 225° C. and pressures within the range of from about atmospheric to about 750 p.s.i.g. Since the operations of the present process include a basic adsorption and desorption step it is possible that the temperature or pressure or both may be varied.

The adsorbent may be used in various forms. The best results are achieved when using small particle size—preferably from about 20 through 40 mesh particle size as measured by standard screening techniques. The relatively small adsorbent size prevents channelling of fluid through the adsorbent bed and, to an extent, helps to reduce void volume between the particles while in many cases increasing the surface area of the adsorbent particles.

The adsorbents which can be used in the process include the Type X or Type Y structured crystalline aluminosilicates or the naturally occurring faujasite species. The Type X zeolite is described in U.S. Pat. 2,882,244 while the Type Y zeolite is described in U.S. Pat. 3,130,007. The adsorbents as described above can contain cations selected from the group consisting of alkali metals (Group I-A), the alkali-earth metals (Group II-A), the coinage metals (Group I-B), or the Group II-B metals. Preferred metals selected from the aforementioned group include lithium, sodium, potassium, magnesium, calcium, strontium, barium, copper, silver, gold, zinc, cadmium, and mercury. Additionally, combinations of the above mentioned metals may be included to enhance the adsorbent's selectively for the olefins and to help reduce the harmful effects of side reactions including polymerization.

DESCRIPTION OF THE DRAWING

The attached drawing illustrates the improved process. The solid adsorbent, which is used in the improved process, flows in a downward direction through lines 14, 15, 16, 17, 18, 19 and 20 and passes through the five individual adsorbent sections labeled as sections I, II, IIIA, IIIB, IIIC and IV. Overall liquid flow in the process is in an upward direction through lines 7, 8, 9, 10, 11, 12 and 13.

In order to maintain continuous operations, a pump around circuit is utilized which is represented by conduits 7 and 13 which is attached to terminal sections IIIC and IV. The pump around circuit contains a fluid displacement means 21 which can be any type of pump which is known to the art. The continuous flow of fluid through the process is induced by the pump around circuit. The fluid leaving section IV via line 13 passes into line 7 through pump 21 and into section IIIC via line 7. The pump around circuit may also induce flow into section IV by causing some of the fluid flowing into the process via line 6 to be diverted via lines 7 and 13 into section IV with the overall fluid flow in the process remaining in an upward direction. In order to maintain continuous operations with respect to the solid adsorbent, the adsorbent which leaves section IIIC via line 20 can be recycled back to section IV via line 14. The solid adsorbent can then flow down through the various adsorbent sections via lines 15, 16, 17, 18, 19 and 20. The multiple stage operations can include one or more series of groups of three operational zones stacked one upon another. Reference can be made to Broughton U.S. Pat. 3,374,099 (Cl. 208-310) for a further explanation of the moving bed scheme. Reference can also be made to Broughton, U.S. Pat. 2,985,589 (Cl. 210-34) and a paper entitled "Continuous Adsorptive Processing—A New Separation Technique" by D. B. Broughton presented at the 34th Annual Meeting of the Society of Chemical Engineers at Tokyo, Japan, on Apr. 2, 1969, for further explanation of the fixed bed counter-current process flow scheme.

Lines 1, 2, 3, 4, 5 and 6 are inlet or outlet streams which are used to pass fluid material into or out of the process. The inlet streams pass fluid into the process to contact adsorbent material which passes in a downward direction via lines 14 through and including 20. Line 1 represents a raffinate outlet stream and has raffinate material passing through it out of the process. Line 2 represents a feed inlet stream through which feed materials pass into the process to be contacted by adsorbent descending through an adsorption zone. Line 3 represents an extract olefin outlet stream and has passing through it olefinic material which has been removed from the adsorbent in a desorption zone. Line 4 represents the improvement of the process of this invention and is a second desorbent inlet stream through which desorbent material passes to help desorb olefinic materials from the adsorbent. Line 5 represents the extract contaminant outlet stream and has passing through it out of the process contaminant materials which had previously been adsorbed by the adsorbent and which have been desorbed by a first desorbent stream described below. Line 6 represents the first desorbent inlet stream and has passing through it a first desorbent fluid which passes into the process to help desorb contaminant materials which are present upon the adsorbent.

The six individual sections labeled I, II, IIIA, IIIB, IIIC, and IV represent various sections of adsorbent material in which individual operations are taking place. In instances in which the process is performed by utilizing a fixed bed of adsorbent the inlet and outlet streams are shifted in a given direction at various time intervals to essentially simulate a countercurrent moving bed system.

In order to simplify the explanation of the various operations taking place within the process it is necessary to define the process in terms of separate operational zones. Three basic operational zones are utilized— namely, an adsorption zone, a rectification zone, and a desorption zone. In some instances, an optional fourth operational zone referred to as a buffer zone is utilized, but this zone is not necessary to enable a separation to occur.

The adsorbent present between the feed inlet stream, line 2, and the raffinate outlet stream, line 1, proceeding in a direction from line 2 through adsorbent section I and to line 1 is defined as the adsorption zone. The feed stream passes through line 2 into line 11, along with any materials which may pass from section II into line 11, into section I which is the adsorption zone. In the adsorption zone, the selectively adsorbed extract material (olefins) and the contaminant materials are adsorbed while the less selectively retained raffinate materials (saturated hydrocarbons) generally remain in the interstitial void spaces surrounding the adsorbent. The raffinate material which is not adsorbed by the adsorbent leaves the adsorption zone via line 12 and depending on the flow of material in the upper portion of line 12 can pass out of line 1 or partially by-pass line 1 and flow into line 12 and section IV. In other instances the flow in the portion of line 12 which connects line 1 to section IV may be in a downward direction so that material passing out of line 1 comprises both raffinate material from the adsorption zone and material which may pass out of section IV via line 12. In cases where section IV is not utilized the flow through line 12 will generally be in a downward direction.

The fluid flow in the process is considered to be generally in an upstream direction. For purposes of stream identification, the raffinate output stream when observed from the feed stream in the adsorption zone is considered to be in downstream direction.

Adsorbent passes through line 15 into the adsorption zone and is contacted with feed stock material. The above described adsorption zone operations then take place. The adsorbent then passes out of the adsorption zone via line 16 which is connected to the rectification zone.

The rectification zone is defined as the adsorbent located between the extract olefin outlet stream, line 3, proceeding in a downstream direction to the feed input stream, line 2 (section II). The basic operations taking place in the rectification zone is the purification of adsorbed materials present in the adsorbent. The adsorbent passes into the rectification zone past feed stream 2 and out of the rectification zone past stream 3, the extract olefin outlet stream. The adsorbent passes into this zone contains adsorbed extract olefins, contaminant materials and some raffinate material since the solid has just been in contact with the feed stream which contains all three components. As the adsorbent proceeds in an upstream direction (from line 2 to line 3) through the rectification zone it contacts fluid material which contains an ever-increasing concentration of olefins and a second desorbent which is passed into the rectification zone from its upstream boundary (line 3, the extract olefin outlet stream). The adsorbent in passing through the rectification zone then becomes more concentrated with both olefinic material and less concentrated with raffinate materials, since the raffinate can be displaced from the adsorbent by high concentrations of olefins and desorbent. Since there is a net fluid flow through the rectification zone in an upward direction, a portion of the extract olefin which would normally be removed via line 3 must bypass line 3 via line 10 and passes into the rectification zone. This stream provides enough volume of olefins and a second desorbent to help in rectification and to help to physically displace raffinate materials present in the interstitial void spaces surrounding the adsorbent which have been desorbed from the adsorbent. The raffinate material which is displaced passes out of the rectification zone via line 11 and contacts the feed stream which connects with line 11 via line 2 and eventually is passed into the adsorption zone. The raffinate material which leaves the rectification zone via line 11 is essentially pure raffinate. By maintaining a net liquid flow in line 11 in a direction from the rectification zone to the adsorption zone it is possible to eliminate contamination of the extract olefin stream with raffinate material. By preventing the passage of extract olefin materials through line 11 into the adsorption zone, it is possible to minimize the quantity of adsorbent required for a given feed rate.

The desorption zone is defined as the adsorbent located between the first desorbent inlet stream, line 6, downstream to the extract olefin outlet stream, line 3. As shown in the diagram the desorption zone includes sections IIIA, IIIB and IIIC. Located within the desorption zone is an extract contaminant outlet stream, line 5, and the second desorbent inlet stream, line 4. The second desorbent inlet stream is essentially the improvement of this invention.

The operations taking place within the desorption zone can be broken down into two essential steps. The first operation to take place on the adsorbent as it passes down through the desorption zone via lines 17, 18, 19 and 20 is the desorption of olefinic materials from the adsorbent. This operation takes place in the downstream portion (section IIIA) of the desorption zone between the second desorbent inlet stream, line 4, and the extract olefin outlet stream, line 3. Section IIIA is referred to as the olefin desorption section of the desorption zone. The second operation taking place on the adsorbent as it passes through the desorption zone is essentially a desorption of contaminant materials from the adsorbent. This operation takes place in an upstream portion (section IIIC) of the desorption zone between the first desorbent inlet stream, line 6, and the extract contaminant outlet stream, line 5. This portion of the desorption zone is referred to as the contaminant desorption section. Adsorbent may be present in section IIIB zone to allow the olefin and contaminant desorption zones to be physically separated to help induce stable operations during separation.

The adsorbent entering the desorption zone contains essentially adsorbed olefinic and contaminant materials. Desorbent material may be present on the adsorbent because of its contact with the desorbent containing mixture which bypasses line 3 passing into the rectification zone via line 10. As the adsorbent passes down through the olefin desorption section of the desorption zone it contacts a stream made up of a second desorbent material which effectively causes the selective desorption of olefins from the adsorbent while allowing most of the contaminant materials to remain upon the adsorbent. The second desorbent stream passes into the olefin desorption section via line 4 and contacts material passing through line 9 and then passes into section IIIA. The olefinic materials desorbed from the adsorbent are removed from Section IIIA via line 10 and pass out of the process in admixture with some of the second desorbent via the extract olefin outlet stream, line 3. A portion of the extract olefin outlet stream may by-pass line 3 and pass via line 10 into the rectification zone. The adsorbent passing through line 18 out of the olefin desorption section past the second desorbent inlet stream, line 4, contains adsorbed contaminant materials and a portion of the second desorbent material which has displaced the desorbed olefins from the adsorbent.

The adsorbent which leaves the olefin desorption section of the desorption zone, may pass directly into the contaminant desorption section or it may pass through an intermediate section of adsorbent. In the drawing, an intermediate section is shown by section IIIB which can have fluid flowing through it in either an upward or downward direction. In cases where downward flow through section IIIB takes place, some of the second desorbent flowing through line 4 passes downward through line 9 into section IIIB. This type of flow would prevent contamination of the extract olefins, with contaminants since the contaminants which are removed via the extract contaminant line 5 do not have the opportunity to enter section IIIB via line 8. The downward flow through section IIIB would probably increase the amount of the second desorbent needed in the process since the portion of the second desorbent passing into section IIIB does not function to desorb olefins from the adsorbent in section IIIA.

In cases where upward fluid flow through section IIIB takes place, some of the extract contaminant outlet stream bypasses line 5 via line 8 and passes into section IIIB. This type of flow would increase the chance of extract olefin contamination with contaminants, since they could pass through section IIIB and into section IIIA. However, the amount of second desorbent utilized would be reduced since none of it would have to flow down into section IIIB.

The desorption of contaminant materials essentially takes place in the contaminant desorption section which is defined as the adsorbent located between the first desorbent inlet, line 6, downstream to the extract contaminant outlet stream, line 5. Section IIIC of the desorption zone is the contaminant desorption section. The adsorbent which passes into section IIIC via line 19 contains adsorbed contaminant material and, depending on whether the fluid flow through section IIIB is an upward or downward direction, varying quantities of adsorbed first and/or second desorbent materials. As the adsorbent passes through the contaminant desorption section, it contacts an ever increasing concentration of the first desorbent material which passes into the process via lines 6 and 7. The first desorbent desorbs contaminant materials from the adsorbent. Both the first and second desorbent must be relatively easily displaced from the adsorbent in order that the adsorptive volume of the adsorbent will not be permanently reduced by a strongly adsorbed desorbent material. The contaminant materials and a portion of the first desorbent plus the second desorbent, if any, which is desorbed by the first desorbent passes out of the process via line 8 and the extract contaminant outlet stream line 5.

The adsorbent which leaves the contaminant desorption section of the desorption zone via line 20 contains essentially adsorbed first desorbent material. In some instances this adsorbent may also contain a small or sizeable portion of adsorbed second desorbent material. The adsorbent can be reused passing into the optional buffer zone via line 14 before passage into the adsorption zone. In instances in which the optional buffer zone is not utilized, the adsorbent which has been removed from the desorption zone via line 20 can be passed directly into the adsorption zone via line 15.

The flow through line 13 which is induced by pump 21 can be either in a direction flowing from section IV to section IIIC or in the opposite direction, depending upon such factors as whether or not the optional buffer zone is utilized or, when it is used, whether or not it is desirable to reduce the quantity of the first desorbent needed. The optional buffer zone is defined as the adsorbent located between the first desorbent inlet stream, line 6, and the raffinate outlet stream, line 1. In instances in which it is desired to reduce the quantity of the first desorbent utilized in the process, the buffer zone is operated in the following manner. A portion of the raffinate outlet stream which normally passes through line 1 is allowed to bypass line 1 and pass via line 12 into section IV which represents the buffer zone. The raffinate material desorbs most of the desorbent material which is adsorbed on the adsorbent which has passed out of the desorption zone via line 20. The desorbent material displaced from the adsorbent in section IV passes, via line 13, pump 21 and line 7, to section IIIC thereby reducing the quantity of desorbent material which is required to pass into the contaminant desorption zone via lines 6 and 7. Under these conditions the buffer zone acts, as its name implies, to prevent the passage of raffinate material into the contaminant desorption zone to eventually contaminate either or both of the extract outlet streams. The buffer zone contains enough adsorbent to prevent the raffinate material, which is displacing desorbent material from the adsorbent, from passing through the buffer zone and pass into line 13.

In instances in which a buffer zone is not utilized, the raffinate material is prevented from contaminating either or both of the extract outlet streams by allowing the first desorbent material which passes into the process via lines 6 and 7 to pass through line 7 both into section IIIC and in the direction of pump 21 through line 13.

EXAMPLE I

In this example various adsorbents were used to determine the relative selectivity of each adsorbent for aromatic hydrocarbons as compared to olefinic type hydrocarbons. The testing conditions include 100° C. temperature and sufficient pressure to maintain steady liquid phase operations. The feed stocks used consisted of 0.5% of diisopropylbenzene, 10.0 vol. percent decene-1 and 89.5 vol. percent iso-octane, or 0.1 vol. percent naphthalenes, 10.0 vol. percent decene and 89.9 vol. percent iso-octane. These concentrations of aromatics were chosen because they occur in many olefinic feed streams in these relative concentrations.

The tests were carried out as follows. The sieves were initially contacted with the blend containing the decene-1 and the aromatic until equilibrium between the adsorbed and external liquid phases were reached. The adsorbed olefin and aromatic were then displaced by passing a mixture of 5 vol. percent isopentane with 95 vol. percent of octene-1 over the sieves. The isopentane was used as a tracer to help determine the breakthrough of the octene-1 as measured by a chromatograph.

There were three types of adsorbents which were tested. All the adsorbents were type Y structurted crystalline aluminosilicates. Adsorbent Na–Y was a sodium form, adsorbent K–Y was a totally potassium exchanged sodium zeolite and adsorbent Ag–Y was a partially silver exchanged sodium zeolite which contained about 7.8 wt. percent silver.

In order to fully understand the results of this example the selectivity of an adsorbent is defined. The term selectivity when referred to adsorptive separation refers to the ratio of the concentrations of two components present within the adsorbent and externally surrounding the adsorbent. More specifically, the selectivity can be defined as expressed in Equation 1 below, $$B_{x/y} = \frac{\left(\frac{x}{y}\right)_a}{\left(\frac{x}{y}\right)_u} \quad (1)$$

wherein B is the selectivity, x and y are the components whose selectivities are being compared, the quantity $$\left(\frac{x}{y}\right)_a$$

represents the ratio of the volumetric concentrations of the components x and y which are adsorbed within the adsorbent, the quantity $$\left(\frac{x}{y}\right)_u$$

represents the ratio of the volumetric concentrations of the components x and y which are present in the external phase surrounding the adsorbent. The selectivity of the adsorbent is measured at what is considered to be equilibrium conditions which require that there be no net transfer of materials between the adsorbed and unadsorbed phases when the selectivity is measured. The equilibrium conditions are most easily achieved by passage of a known composition containing the two components, which are to be compared in selectivities, through a bed of the selected molecular sieve adsorbent and continuing passage of the feed stream through the molecular sieve adsorbent bed until the composition of the material passing out of the adsorbent bed is substantially identical to the composition of feed material passing into the adsorbent bed. Both the feed and effluent streams having the same composition, a state of equilibrium conditions is achieved and there is no net transfer between the adsorbed and external phases of the two components. After equilibrium conditions have been reached, the feed or external stream is drained off from the adsorbent and a desorbent material is then passed through the adsorbent bed to displace essentially all the adsorbed material present within the adsorbent. By employing suitable chromatographic equipment to monitor the effluent stream composition and knowing the rates of the material passing into the molecular sieve adsorbent bed, it is possible to determine the composition and quantity of the material that was adsorbed by the adsorbent. Upon determination of the composition of the adsorbed material present within the adsorbent and knowing the composition of the feed stream when equilibrium conditions were achieved, it is possible to determine the selectivity as defined in Equation 1.

In referring to Equation 1 above, a selectivity greater than unity is an indication of selective adsorption by the adsorbent of component x while a selectivity less than unit would indicate a preference of the adsorbent for component y. Selectivities approaching unit indicate that there is no preference by the adsorbent being tested for either of the two components being measured for relative selectivity.

The selectivities for the adsorbent tested in example are shown in Table I below.

TABLE I.—SELECTIVITY OF AROMATIC WITH RESPECT TO DECENE-1

| Adsorbent | Aromatic tested | Selectivity, B aromatic/ decene-1 |
| --- | --- | --- |
| Na–Y | Naphthalene | 625 |
| Na–Y | Diisopropylbenzene | 68 |
| Ag–Y | Naphthalene | 650 |
| Ag–Y | Diisopropylbenzene | 8 |
| Ag–Y | α-Methylnaphthalene | 224 |
| K–Y | Naphthalene | 824 |
| K–Y | Diisopropylbenzene | 96 |

As can be seen from the above data the aromatics tested on the various desorbents varied to a large extent in selectivity but in all cases were more strongly held on the adsorbent. The diolefins, although not tested would be more strongly held by the adsorbent than the feed olefins. The other cations which previously have been disclosed would also give similar results as would the type X structured zeolites.

EXAMPLE II

A $C_{11}$ through $C_{14}$ dehydrogenation reactor effluent was used as a feed in a series of separation experiments used to verify the ability of a selected adsorbent to selectively adsorb olefins from a feedstock containing paraffins, olefins and contaminants. The feedstock composition is shown in Table II following:

TABLE II.—FEEDSTOCK ANALYSIS

GLC

|  | Wt. percent |
|---|---|
| n-$C_{10}$ paraffin | 0.1 |
| n-$C_{11}$ paraffin | 24.9 |
| n-$C_{11}$ olefin | 1.8 |
| n-$C_{12}$ paraffin | 27.8 |
| n-$C_{12}$ olefin | 2.6 |
| n-$C_{13}$ paraffin | 22.6 |
| n-$C_{13}$ olefin | 2.7 |
| n-$C_{14}$ paraffin | 12.1 |
| n-$C_{14}$ olefin | 1.7 |
| $C_{15}$ paraffin | 0.4 |
| Total normal olefin | 8.8 |
| Total normal paraffin | 87.9 |
| Total non-normals | 3.3 |

GLC

|  | Vol. percent |
|---|---|
| Total olefins | 9.8 |
| Light ends | 0.2 |
| Total paraffins | 86.5 |
| Total non-normals | 3.5 |

M.S.

|  | Wt. percent |
|---|---|
| Aromatics | 0.35 |
| Di-olefins | 0.95 |
| Mono-olefins | 10.65 |

The dehydrogenation reactor effluent was passed through a bed of 320 cc. of a selected type Y adsorbent at a pressure of 300 p.s.i.g. and a liquid hourly space velocity of 2.8. After the adsorbent appeared to be fully loaded with the olefins and contaminants from the dehydrogenation reactor effluent, a flush stream of iso- and normal pentane was passed through the adsorbent bed to flush away paraffins remaining in the interstitial voids between the adsodbent particles. After the paraffins from the dehydrogenation reactor effluent were removed, a desorbent stream was passed through the adsorbent bed to remove the selectively sorbed olefins and aromatics. The recovered mixture which comprised desorbent and the selectively adsorbed olefins and aromatics was fractionated to remove the desorbent material. The remaining olefinic extract material was analyzed using chromatographic methods.

Five individual tests were run using the feedstock of Table II and the same general procedures described above. The operating conditions for the individual tests are summarized below:

Test A: A sodium form type Y zeolite adsorbent which was calcined for 2 hours at 450° C. was used. The adsorption and desorption operations were carried out at 300 p.s.i.g. and 150° C. The desorbent material which was used to displace the adsorbed olefins and aromatics was essentially 100% octene-1.

Test B: The adsorbent employed in this test was a silver-exchanged type Y structured zeolite which after drying at 450° C. for 2 hours, contained about 9.85 wt. percent silver, as the element. Adsorption and desorption operations were effected at 300 p.s.i.g. and Test C: Same as Test 2 except a 100 vol. percent octene-1 desorbent was used.

Tests D and E: The adsorbent was a silver exchanged type Y structured zeolite which contained about 8.5 wt. percent silver after drying for 2 hours at 450° C. Adsorption and desorption conditions were effected at 300 p.s.i.g. and 100° C. A two-step desorption was employed using a first desorbent of about 100 vol. percent octene-1 followed by a second desorbent of 1.5 vol. percent octene-1 in iso-octane.

The results of the above five tests are shown in Table III following:

TABLE III.—OLEFINIC EXTRACT ANALYSIS

| | Test A | Test B | Test C | Test D | Test E |
|---|---|---|---|---|---|
| Total vol. of feed passed through Adsorbent bed, cc | 2,595 | 2,270 | 2,439 | 1,977 | 1,970 |
| Purity of olefinic material recovered,[1] vol. percent | 17.7 | 96.8 | 95.6 | 97.8 | 98.4 |
| GLC analysis, vol. percent: | | | | | |
| $C_{10}$ | Trace | 3.0 | 0.1 | 0.1 | Trace |
| n-$C_{10}$ paraffin | | Trace | | 0.2 | 0.1 |
| n-$C_{10}$ mono-olefin | | 2.8 | 1.3 | 5.6 | 1.6 |
| n-$C_{11}$ paraffin | 4.6 | 0.9 | 0.8 | 0.2 | 0.3 |
| n-$C_{11}$ mono-olefins | 0.5 | 23.7 | 17.5 | 23.4 | 23.3 |
| n-$C_{12}$ paraffins | 31.9 | 1.0 | 1.0 | 0.2 | 0.4 |
| n-$C_{12}$ mono-olefins | 5.8 | 31.6 | 29.0 | 28.6 | 30.4 |
| n-$C_{13}$ paraffins | 29.0 | 0.8 | 1.1 | 0.2 | 0.3 |
| n-$C_{13}$ mono-olefins | 7.1 | 25.2 | 27.4 | 23.9 | 25.1 |
| n-$C_{14}$ paraffins | 14.7 | 0.4 | 1.3 | 0.4 | 0.5 |
| n-$C_{14}$ mono-olefins | 4.0 | 9.6 | 14.8 | 11.3 | 12.6 |
| n-$C_{15}$ paraffins | 0.7 | | | | |
| $C_{15}+$ | 1.7 | 1.0 | 5.7 | 5.9 | 5.4 |
| MS analysis of $C_{15}+$, vol. percent: | | | | | |
| Olefins and paraffins | | 95.0 | | | 85.0 |
| Aromatic types: | | | | | |
| Benzene or alkylbenzenes | | 4.4 | | | 9.9 |
| Indanes or tetraline | | 0.5 | | | 3.3 |
| Indenes or dihydronaphthalenes | | Trace | | | 0.7 |
| Naphthalenes | | Trace | | | 1.1 |
| Total Aromatics | | 4.9 | | | 15.0 |

[1] Based on $C_{10}$ through $C_{14}$ extract material recovered after separation from desorbent material.

NOTE.—Tests B and E were the only two tests in which the $C_{15}+$ material was analyzed.

As can be concluded from the above data, most of the aromatic contaminants which were present in the feedstock were present in the adsorbed material which was recovered from the adsorbent during the desorption operations. This prevents an aromatic build-up on the adsorbent but does not eliminate contamination of product extract with the aromatic contaminants. If desorbents were selected which did not desorb the aromatic contaminants from the adsorbent there would be no problem of product extract contamination, but the adsorbent's capacity would be reduced by the presence of the aromatic on the adsorptive sites within the adsorbent resulting in a reduction in the process efficiency.

In the process claimed herein, the olefin and contaminant desorption sections of the desorption zone can effectively, in combination, remove contaminant aromatics from the adsorbent without unduly contaminating the extract olefin stream.

A broad embodiment of the process of this invention resides in a fixed-bed simulated countercurrent flow type process in which a selected adsorbent is used to separate monoolefinic hydrocarbons from saturated hydrocarbons present in a feed stock containing a quantity of contaminants, by periodically shifting in a single direction through said quantity of adsorbent: (1) an adsorption zone defined as the adsorbent located between a raffinate outlet stream and a feed inlet stream, said raffinate stream located downstream from said feed stream with respect to fluid flow through said zone; (2) a rectification zone defined as the adsorbent located between said feed stream inlet line and an extract olefin outlet stream, said feed stream located downstream from said extract olefin stream with respect to fluid flow through said rectification zone, said rectification zone located immediately upstream from said adsorption zone with respect to fluid flow in said adsorption zone; (3) a desorption zone defined as the adsorbent located between said extract olefin outlet stream and a first desorbent inlet stream, said extract olefin outlet stream downstream from said first desorbent stream with respect to fluid flow in said zone, said zone located immediately upstream from the rectification zone with respect to fluid flow in said adsorption zone, said desorption zone having an extract contaminant outlet stream located between said first desorbent inlet and said extract olefin outlet stream; while controlling the rate of flow rates of material through said inlet and outlet streams in a manner to effect: (a) the passage of said feed inlet stream into said adsorption zone and the withdrawal of said raffinate outlet stream from said adsorption while effecting adsorption of olefins and contaminants by the adsorbent in said zone; (b) the displacement of raffinate materials from the adsorbent and interstitial spaces between adsorbent particles located in said rectification zone by the passage of a portion of said extract olefin outlet stream into said zone and the removal of the raffinate materials from the rectification zone; (c) the passage of said first desorbent inlet stream into said desorption zone to effect the first desorption of contaminants from said adsorbent while withdrawing said extract olefin outlet stream and said extract contaminant outlet stream from said desorption zone; wherein an improvement which comprises passing a second desorbent inlet stream into said desorption zone at a location within said zone between said extract olefin outlet stream and said extract contaminant outlet stream.

We claim as our invention:

1. A fixed-bed simulated countercurrent flow type process in which a selected adsorbent is used to separate monoolefinic hydrocarbons from saturated hydrocarbons present in a feed stock containing a quantity of contaminants, by periodically shifting in a single direction through said quantity of adsorbent:

(1) an adsorption zone defined as the adsorbent located between a raffinate outlet stream and a feed inlet stream, said raffinate stream located downstream from said feed stream with respect to fluid flow through said zone;

(2) a rectification zone defined as the adsorbent located between said feed stream inlet line and an extract olefin outlet stream, said feed stream located downstream from said extract olefin stream with respect to fluid flow through said rectification zone, said rectification zone located immediately upstream from said adsorption zone with respect to fluid flow in said adsorption zone;

(3) a desorption zone defined as the adsorbent located between said extract olefin outlet stream and a first desorbent inlet stream, said extract olefin outlet stream downstream from said first desorbent stream with respect to fluid flow in said zone, said zone located immediately upstream from the rectification zone with respect to fluid flow in said adsorption zone, said desorption zone having an extract contaminant outlet stream located between said first desorbent inlet and said extract olefin outlet stream;

while controlling the rate of flow rates of material through said inlet and outlet streams in a manner to effect:

(a) the passage of said feed inlet stream into said adsorption zone and the withdrawal of said raffinate outlet stream from said adsorption zone while effecting adsorption of olefins and contaminants by the adsorbent in said zone;

(b) the displacement of raffinate materials from the adsorbent and the interstitial spaces between adsorbent particles located in said rectification zone by the passage of a portion of said extract olefin outlet stream into said zone and the removal of the raffinate materials from the rectification zone;

(c) the passage of said first desorbent inlet stream into said desorption zone to effect the first desorption of extract olefins and the second desorption of contaminants from said adsorbent while withdrawing said extract olefin outlet stream and said extract contaminant outlet stream from said desorption zone;

wherein an improvement which comprises passing a second desorbent inlet stream into said desorption zone at a location within said zone between said extract olefin outlet stream and said extract contaminant outlet stream.

2. Claim 1 further characterized in that said feed stock contains mono-olefins and paraffins having from about 6 to about 20 carbon atoms per molecule.

3. The process of claim 1 further characterized in that said contaminants are more tenaciously held by said adsorbent than said feed stock mono-olefins.

4. Claim 1 further characterized in that said adsorbent selected from the group consisting of type X or type Y structured zeolites.

5. Claim 4 further characterized in that said absorbent contains at least one cation selected from the group consisting of the group I-A, Group II-A, Group II-B and Group I-B metals or combinations thereof.

6. Claim 1 further characterized in that said raffinate stream contains saturates and desorbent materials.

7. Claim 1 further characterized in that said extract olefin outlet stream contains a desorbent material and mono-olefins.

8. Claim 1 further characterized in that said extract contaminant outlet stream contains desorbent and contaminant type material.

9. Claim 1 further characterized in that said first desorbent material selected from the group consisting of normal olefins, iso-olefins, normal paraffins, and iso-paraffins.

10. Claim 1 further characterized in that said second desorbent material is an aromatic hydrocarbon.

References Cited

UNITED STATES PATENTS

| | | | |
|---|---|---|---|
| 3,455,815 | 7/1969 | Fickel | 208—310 |
| 3,201,491 | 8/1965 | Stine et al. | 208—310 |
| 3,274,099 | 9/1966 | Broughton | 208—310 |
| 3,310,486 | 3/1967 | Broughton et al. | 208—310 |
| 3,510,423 | 5/1970 | Neuzil et al. | 208—310 |

HERBERT LEVINE, Primary Examiner

U.S. Cl. X.R.

260—683 R